United States Patent
Ziai et al.

(10) Patent No.: US 8,360,328 B2
(45) Date of Patent: Jan. 29, 2013

(54) RFID TAG

(75) Inventors: Mohamad Ali Ziai, Canterbury (GB); John Colin Batchelor, Canterbury (GB)

(73) Assignee: University of Kent at Canterbury, Canterbury, Kent (GB)

( * ) Notice: Subject to any disclaimer, the term of this patent is extended or adjusted under 35 U.S.C. 154(b) by 0 days.

(21) Appl. No.: 12/992,706

(22) PCT Filed: May 20, 2009

(86) PCT No.: PCT/GB2009/050545
§ 371 (c)(1),
(2), (4) Date: Feb. 1, 2011

(87) PCT Pub. No.: WO2009/141653
PCT Pub. Date: Nov. 26, 2009

(65) Prior Publication Data
US 2011/0114735 A1    May 19, 2011

(30) Foreign Application Priority Data
May 20, 2008 (GB) .................................. 0809141.5

(51) Int. Cl.
*G06K 19/06* (2006.01)

(52) U.S. Cl. ........................................................ 235/492
(58) Field of Classification Search ................... 235/492
See application file for complete search history.

(56) References Cited

U.S. PATENT DOCUMENTS

| 2005/0275591 | A1 | 12/2005 | King |
| 2007/0080233 | A1 | 4/2007 | Forster |
| 2008/0036673 | A1* | 2/2008 | Yamagajo et al. ............ 343/793 |
| 2008/0191945 | A1 | 8/2008 | Taki et al. |

FOREIGN PATENT DOCUMENTS

| EP | 1035418 A1 | 9/2000 |
| EP | 1128467 A2 | 8/2001 |
| JP | 2005149298 A | 11/2003 |
| JP | 2005198168 A | 1/2004 |
| WO | WO-2007/010675 A1 | 1/2007 |
| WO | WO-2007/028379 A1 | 3/2007 |
| WO | WO-2007/102360 A1 | 9/2007 |
| WO | WO-2008/029769 A1 | 3/2008 |

* cited by examiner

*Primary Examiner* — Daniel Hess
(74) *Attorney, Agent, or Firm* — Barnes & Thornburg LLP

(57) ABSTRACT

An antenna for an RFID transponder device having a substrate and an RF integrated circuit. The antenna comprises two opposing conductive elements arranged on one side of the substrate and electrically connected to the integrated circuit; and a conductive patch arranged between the elements on the same side of the substrate and not electrically connected to them.

13 Claims, 2 Drawing Sheets

RFID TAG

This invention relates to an antenna for a Radio Frequency Identification (RFID) device, commonly known as an RFID tag. In particular, it relates to an RFID tag designed for the Ultra High Frequency (UHF) band range.

The need to track and identify items of concern arises in manufacturing, distribution and inventory systems. The relevant items may be, for example, inventory items, packages, or individual parts. For convenient identification and tracking, it is desirable to communicate information about such items wirelessly and preferably passively. RFID is a well known method of identifying and tracking objects by attaching an active or passive transponder that responds to radio frequency commands. The transponder is typically incorporated into a tag or label. When an object with an RFID tag is put in a read zone of an RFID reader, the reader transmits an interrogation signal to the RFID tag by modulating an RF signal, having a specific carrier frequency. The RFID tag responds to the interrogation of the RFID reader by retransmitting a switch-modulated form of the original illuminating wave back to the reader. The switch-modulation of the response encodes data about the item to which the tag is attached. The necessary signal processing is carried out in an Integrated Circuit (IC) in the tag.

In a passive tag, electromagnetic waves received by the tag antenna are rectified by the RF front-end circuit in the RFID tag and the rectified electromagnetic wave is used by the tag as the power source for operation. The intensity of the electromagnetic waves transmitted by the reader should be larger than a specific threshold level for normal operation of a passive tag. The power available to the tag decreases with increasing distance from the reader and so the read range is limited by the power of the RFID reader. Since the transmission power of a reader is limited by local regulation of each country, it is very important to deliver the maximum possible power received by the tag antenna to the RF front-end of the tag IC.

An RFID tag might be attached to a wide variety of objects or packaging. For example, liquid is shipped in plastic or metallic containers; other items are shipped in wooden boxes; and many items use metallic films in their packaging. In general, an RFID tag antenna is designed to operate on a given type of base material—the material of the object or package to which it is intended to be attached. Attachment to other types of base material will cause the read range to deteriorate from the optimal designed values. This is mainly because the antenna characteristics depend on the substrate on which the radiating elements are fabricated. Each substrate has its own dielectric constant, and the effective dielectric constant seen by the antenna will be affected by the base material to which the substrate is attached. Note that, in some designs, the base material itself is the substrate, with the antenna elements printed or fabricated directly on packaging material, for example. However, this can increase the range of variability of the dielectric characteristics still further.

Even for a single base material, the effects of thickness and environmental variations such as humidity can cause a significant degradation in tag read-range. Impedance matching between the tag antenna port and the front-end of the tag IC is important in tag operation as it ensures the most efficient energy transfer; this is needed for obtaining maximum read range. In conventional tag antenna designs, the dependence on base characteristics makes such impedance matching difficult to achieve, in general.

US2007/0080233 attempts to address the problems of varying dielectric characteristics of the substrate or base material. It discloses dipole tags printed onto thin substrates. Conducting surfaces may lie on the facing side of the substrate. At UHF frequencies the substrate is required to be 3-6 mm thick at 900 MHz and 0.5-3 mm thick at 2450 MHz. One embodiment of US2007/0080233 uses capacitive taps at an intermediate level between the top and bottom surfaces connected to the top surface with a vertical via sheet. This increases the complexity of manufacturing.

Another known approach is the use of encapsulation to overcome the operational sensitivity of RFID tags to any variation of dielectric characteristics of the objects and packaging to which the tag is attached. This entails encapsulating the tag antenna and tag IC on a known substrate in a hard casing and then attaching the encapsulated system either by floating the system next to the object, or by leaving a gap between the object and the antenna large enough to limit the dielectric variation effect. In many commercially available tags, this distance is about 10 mm or more. Tags of this kind are prone to damage during transportation and are cumbersome, as the tags are encapsulated in hard casing which increases tag size and thickness Furthermore, the cost of manufacturing an encapsulated tag is higher due to its complexity.

The present state of art does not provide a very low profile tag antenna that has a complete solution to the problems described. Hence, the need remains for a cheap, thin, efficient antenna design that has general application and can efficiently operate in the presence of metal and liquid.

According to an aspect of the current invention, there is provided an antenna for an RFID transponder device having a substrate and an RF integrated circuit, the antenna comprising: two opposing conductive elements arranged on one side of the substrate and electrically connected to the integrated circuit; and a conductive patch arranged between the elements on the same side of the substrate and not electrically connected to them.

A tag antenna with this design is insensitive to variations in base material characteristics since the conducting elements lie in the same plane (that is, on one surface of a substrate). As a result, the electric fields that give rise to radiation are parallel to this surface and do not strongly fringe to the opposite surface of the substrate, which is attached, in use, to the base material of the object or package. This also allows the substrate (and thus the whole tag) to be thinner than comparable devices. At the same time, the tag can be mounted directly on the surface that is being tagged, without spacing or offset, and still offer high performance and a long read-range. The conductive patch is a passive coupled element. By positioning this element in the space inside or between (according to the specific layout embodied) the main (feed) conductive elements, the area occupied by the overall antenna is minimized. The conductive elements may be formed in straight strips or they may include angles or curves. They may completely or partly circumscribe the patch. If the pattern of the elements is rectilinear, for example, they may surround the patch on two (opposing) sides; three sides (two of which are opposing) or may enclose the perimeter of the patch on all four sides. In general, the design comprises two conductive elements around the patch. However, this does not exclude the possibility of an additional electrical connection between these two elements creating a closed-loop. The design can be produced by simple, well understood manufacturing methods, since it is based purely on printed planar structures. For example, there is no requirement for through-holes, via-sheets or substrates of varying thickness, which would all add complexity.

Preferably, each element cooperates with the patch to form at least one slot or notch between the element and the patch.

The slot pattern facilitates strong coupling between the feed elements and the patch, which provides the antenna with improved radiation characteristics.

Preferably, a length of the at least one slot or notch is greater than a width of it, the width being the distance between the patch and one element. Preferably, a width of the at least one slot or notch, the width being the distance between the patch and one element, is less than a width of that element.

A narrow separation gap facilitates strong coupling—that is, a high coupling coefficient between the various conductive antenna parts.

Preferably, the width of the at least one slot or notch is substantially uniform along its length.

This provides the antenna with regular and predictable radiation characteristics.

Each element may comprise two substantially straight feed lines arranged perpendicular to one another.

The two feed lines may be arranged end-to-end so as to form an L shape.

The choice of straight and/or rectilinear patterns for the conductive elements enables easy fabrication. It also results in an antenna whose characteristics are readily adaptable by varying a small number of parameters, such as the dimensions or aspect ratio of the pattern.

Each element may comprise a convoluted line element.

The use of convolution, whereby a conductive strip is fabricated in a pattern of repeated turns or folds, enables the antenna element to have a long length in comparison to the surface area it occupies. This allows parameters such as read-range and resonant frequency to be adjusted without changing the form-factor (footprint) of the device.

The patch may be rectangular.

This shape facilitates easy fabrication and cooperates with L-shaped conductive feed elements to provide a constant-width slot.

Preferably, the antenna also comprises a ground plane on the opposite is side of the substrate to the elements and patch, arranged to cover at least partially an area corresponding to the elements and patch.

The addition of the ground plane offers improved robustness to varying base materials, since it acts as a screen between the tag and the mounting surface. The benefits of this improved isolation can be exploited by making the tag even thinner.

The antenna may be adapted for an operating frequency of between 860 MHz and 960 MHz, and have a thickness of the substrate less than 1 mm.

This is considerably thinner than known RFID antennas for the same frequency range.

The substrate may be flexible.

This allows the tag to be attached to arbitrarily curved surfaces. It may also mean the tag is more resilient to deformations of the surface to which it is attached. Neither of these advantages is seen in conventional rigid encapsulated tags.

According to another aspect of the invention, there is provided an RFID transponder device comprising: a non-conductive substrate; an RF integrated circuit; and an antenna as described above.

The invention will now be described by way of example, with reference to the accompanying drawings, in which.

Note that the drawings are illustrative and not necessarily to scale.

Figure 1:
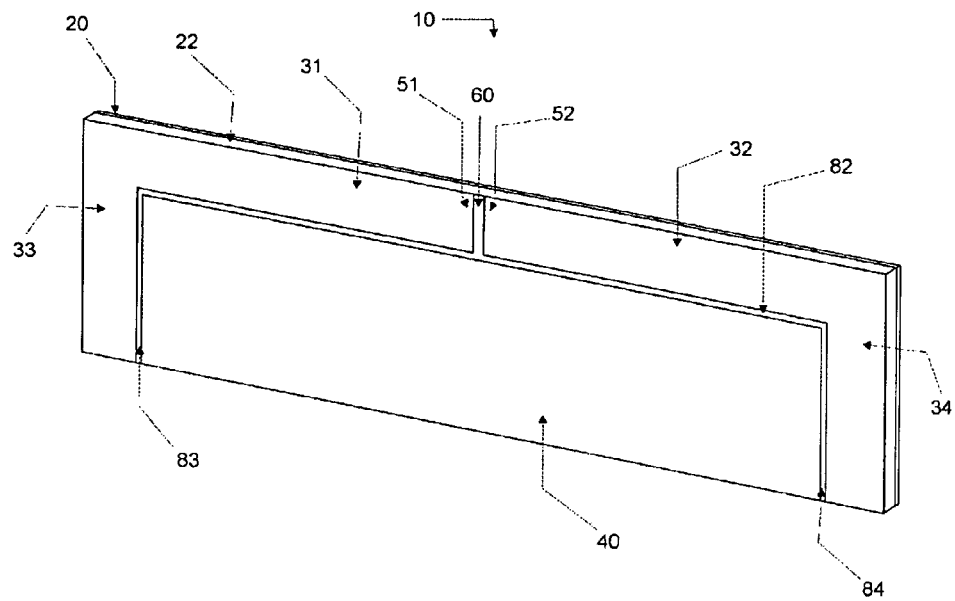
FIG. 1 is a perspective view of an RFID tag according to a first exemplary embodiment.

FIG. 1 is a perspective view showing the configuration of an RFID tag 10 according to a first embodiment of the invention. The tag 10 includes an is antenna {31, 32, 33, 34, 40}, a thin dielectric substrate 22, and a ground plane 20. The antenna {31, 32, 33, 34, 40} is formed on one surface of the dielectric substrate 22, while the ground plane 20 is formed on the opposite surface. The tag 10 is designed such that, in use, it is attached with the surface having the ground plane (the back surface, as pictured in FIG. 1) facing the item to be tagged. In this way, the ground plane 20 and dielectric substrate 22 electrically isolate the antenna on the other side of the substrate, from the base material (not shown) of the item.

The antenna, forms an open loop, and includes line elements 31, 32, 33, 34 and a metallic patch 40. Line elements 31 and 33 are electrically connected to form one arm of the open loop. Line elements 32 and 34 form the other arm, which is symmetrical with the first. However, symmetry is not essential: line elements 31 and 32 can be formed in the same shape (giving symmetry) or similar line shapes. In this example, the line elements of one arm 31, 33 (respectively 32, 44) are arranged end-to-end and perpendicular to one another in the plane of the substrate, resulting in an "L" shape.

The metallic patch 40 is not electrically connected to line elements 31, 32, 33, 34. It is formed inside the loop and spaced apart from the line elements. The separation distance is generally small, so as to induce a high coupling coefficient. In this example, a separation distance of approximately 0.1 mm to 4 mm is sufficient for strong coupling. The metallic patch 40 lies in the same plane as the line elements 31, 32, 33, 34, as all are fabricated on the same surface of the substrate 22.

The antenna, comprised of the metallic patch 40 and conductive line elements 31, 32, 33, 34, is used to transmit and receive electromagnetic waves. The antenna and the ground plane 20, can be printed (for example by silkscreen, gravure, or flexography), etched, stamped or grown and may be to made of any electrically conducting material. The width of the line elements 31, 32, 33, and 34 may be varied according to the desired characteristics of the antenna. The line elements 31, 32, 33, 34 and patch 40 will typically be formed concurrently in a single process step.

The signal processing functions of the RFID tag 10 are carried out by an is semiconductor chip mounted at a location 60 over the slot formed between the ends of the two line elements 31 and 32, corresponding to the ends of each arm of the open loop. The semiconductor chip is an integrated circuit (IC) chip and includes a radio frequency (RF) transmission/reception circuit, a local logic and a memory. The IC receives and transmits radio frequency through the antenna. Conductive contact elements such as straps may be formed on the feeding points 51 and 52 to electrically connect the IC to the antenna line elements 31, 32, 33, 34.

For efficient power transfer between the antenna and the IC, the characteristic impedance of the antenna needs to offer a conjugate match to the characteristics of the IC. The electrical characteristics of the antenna can be easily adjusted by the separation gaps 82, 83 and 84 between metallic patch 40 and line elements 31, 32, 33 and 34. The separation gaps 83 and 84 may be of equal width, which may also be equal to that of separation gap 82. The shape and dimensions of the gaps, in conjunction with shape and dimensions of the elements 31, 32, 33 and 34 can be used to conjugally match the antenna input impedance to the IC impedance.

In this embodiment the length of the line members 31 and 32 parallel to X-axis (that is, the horizontal dimension in the perspective drawing of FIG. 1) between 15% and 70% of the wave length of the resonant frequency of the antenna. The length of the elements 33 and 34 parallel to Y-axis (the vertical dimension, as pictured) affects the read range of the tag 10 and can vary depending on the application of the tag. For example, an RFID tag 10, with 3.44 mm FR-4 substrate 22, length parallel to the X-axis of 100 mm and length parallel to Y-axis of 45 mm attached to a large metallic plate can have maximum read range. However, other examples of this embodiment may be smaller.

The substrate 22 may be formed of any non-conducting materials, such as FR-4, polyethylene terephthalate (PET), polyimide (PI), polyvinyl chloride (PVC), paper, acetate, polyester, polyethylene or plastic. The substrate 22 may have a thickness ranging from less than 1 mm to over 6 mm. Note that the tag form factor in any given design can be affected by substrate dielectric constant and thickness. The ground plane 20 covers the entire surface of the substrate on the opposite side to the antenna {31, 32, 33, 34, 40}.

Figure 2:
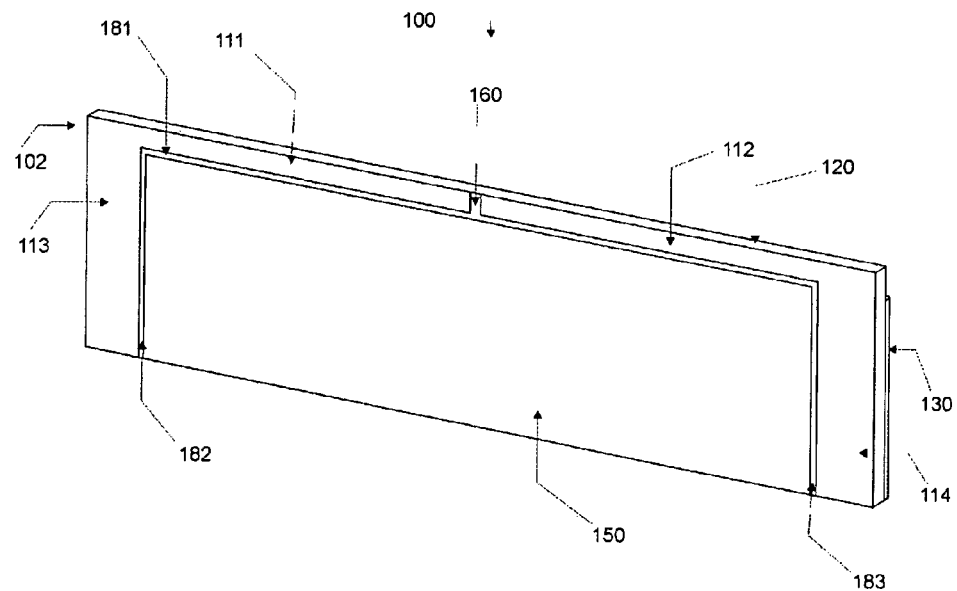
FIG. 2 is a perspective view of an ultra thin and flexible RFID tag according to a second exemplary embodiment.

FIG. 2 illustrates a perspective view of an RFID tag 100 according to a second embodiment. This RFID tag 100 is designed as a very thin flexible RFID tag. The tag 100 includes an antenna 102, a very thin dielectric substrate 120, an integrated circuit attached at a location 160, and a partial ground plane 130. The main structural difference compared to the first embodiment described above is the presence of the partial ground plane 130 in place of the full ground plane 20.

The dielectric substrate 120 and partial ground plane 130 act to electrically isolate the antenna 102 from the material to which the tag 100 is attached, when in use. The feed element of the antenna 102 forms an open loop, including line elements 111, 112, 113, 114. The metallic patch 150 is not electrically connected to line elements 111, 112, 113, 114, is formed inside the loop, and is spaced apart from the aforementioned conductors. The separation distance is generally small to induce a high coupling coefficient. In this example, a separation distance of approximately 0.1 mm to 4 mm is sufficient for strong coupling.

The electrical characteristics of the antenna can be easily adjusted by the separation gaps 181, 182, and 183 between metallic patch 150 and element line 111, 112, 113, 114, the separation gaps 182 and 183 may have equal width, which may also be equal to the width of the separation gap 181. In conjunction with shape of the elements 111, 112, 113, 114 and shape of the partial ground plane 130 these can be used to conjugate match the antenna 102 impedance to the complex impedance of the IC.

The ground plane 130 is formed on the opposite side of the thin dielectric substrate 120—for example, by printing. The length of the ground plane 130 parallel to the X-axis is greater than or equal to the full length of the antenna 102 or more, and the ground plane 130 height parallel to the Y-axis is less than or equal to the height of the metallic patch 150.

The thin substrate 120 is formed of any flexible non-conducting materials such as polyethylene terephthalate (PET), polyimide (PI), polyvinyl chloride (PVC), paper, acetate, polyester, polyethylene or plastic. The substrate 120 may have a thickness ranging from less than 0.1 mm to over 3 mm. The tag form factor and read range may be affected by substrate dielectric constant and the substrate thickness.

The antenna 102 length parallel to the X-axis is between 15% and 50% of the resonant wavelength. The lengths of line elements 113 and 114 parallel to the Y-axis can affect the read range of the tag 100 and can be adjusted depending on the application of the tag. For example, an RFID tag 100 attached to human tissue with length along the Y-axis of less than 10 mm can have acceptable read range.

Figure 3:
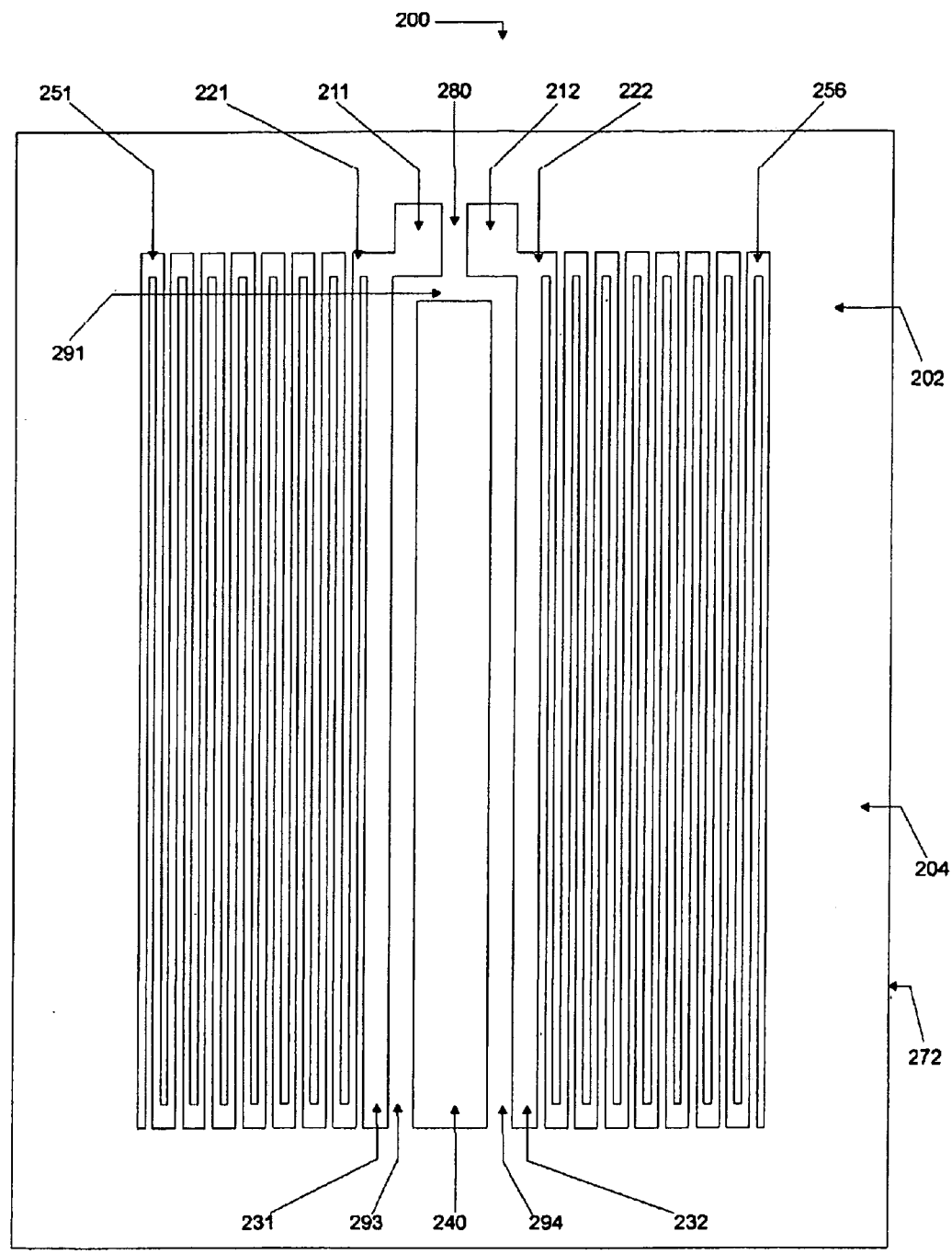
FIG. 3 is a plan view of an RFID tag having two symmetrical convoluted elements attached to the open loop feed antenna according to a third exemplary embodiment.

FIG. 3 illustrates a top view of a third embodiment, which comprises convoluted antenna elements. This RFID tag 200 is designed to have a small form factor. It includes a dielectric substrate 204 and metallic ground plane 272 (on the reverse side of the substrate to that shown in the plan of FIG. 3), and can operate efficiently on any object including a metal plane. The antenna 202 includes conductive line elements 221, 222, 231, 232, metallic connector patches 211, 212, metallic patch 240, and convoluted members 251 and 256. The line elements 221, 222, 231 and 232 create an open loop; with the metallic patch 240 laid inside the loop, not electrically connected to the line members 221, 222, 231, 232. The metallic patch 240 is spaced apart from the mentioned conductors. The separation distance is generally small to induce a high coupling coefficient. In this example, a separation distance of approximately 0.1 to 4 mm is sufficient for strong coupling. An RFID IC is positioned at location 280 over the antenna/substrate and connected to the square metallic patch elements 212 and 213. The patch elements 212, 213 have a side of length 1 mm and are attached to line elements 221 and 222 respectively as shown in FIG. 3. The length of the line elements 221, 222, 231, 232 parallel to the X-axis together with the separation gap 291, 293 and 294 can be used to adjust the input impedance of the antenna to match the complex impedance of the IC 280.

Convoluted elements 251 and 256 are symmetrical and electrically connected to the ends of the line elements 221 and 222. The antenna 202 length parallel to the X-axis is 10-30% of the resonant frequency wavelength. The length of the antenna 202 greatly influences the resonant frequency of the antenna and can be as small as 10%. The number of turns in the convoluted elements 251 and 252 can influence the antenna form factor and read range, with higher convolution corresponding to smaller form factor and smaller read range. The antenna 202 manufacturing method, non conductive substrate material and ground plane configuration is as described above for the first embodiment.

In each of the three embodiments shown in FIGS. 1-3 and described above, the antenna comprises a conductive patch 40, 150, 240 which is directly interposed between two opposing conductive elements that are electrically connected to the integrated circuit. "Directly" interposed means that a straight line drawn from one conductive element to the other crosses only the conductive patch, and does not cross any other conductive area. The patch is therefore immediately adjacent to both of the conductive elements. One conductive element lies immediately on one side of the patch; the other conductive element lies immediately on the opposite side. The patch and both conductive elements are adjacent to the location of the integrated circuit, on three respective sides. The patch is not convoluted.

Taking the orientation shown in the drawings, the patch and at least a portion of each conductive element are disposed below the position of the integrated circuit. Said portions of the two conductive elements are disposed immediately to the right and left, respectively, of the patch. Thus, the patch is located directly between portions of the conductive elements that are as near as possible to the connection to the integrated circuit. With the arrangement shown, it is not possible to draw a straight line from said portion of one conductive element to said portion of the other conductive element without crossing the patch.

The patch shown is rectangular and the conductive elements comprise opposed L-shaped arms, arranged so that each is the mirror image of the other. The L-shapes are mirrored end-to-end, rather than back-to-back. That is, the ends of the arms lie adjacent to one another at one end of the L-shape, and it is at this location that they can be connected to the integrated circuit. The patch is positioned in the space between the opposed arms of the L-shapes.

The conductive elements and the integrated circuit together define a "U-shape", or three sides of a rectangle. The fourth side of the rectangle (or the end of the "U") is open and the patch lies in the interior of the rectangle. The entire arrangement is mirror-symmetrical about an axis running through the position of the integrated circuit.

The example tag designs presented above are based purely on planar structures, such as may be printed using well known techniques. There is no requirement for through-vias or other structural features which would increase manufacturing cost and complexity. The antenna design according to the current invention also allows the manufacture of thinner tags to enable low profile attachment to surfaces without risk of damage or accidental removal. Despite this thin profile the RFID tag of the invention can be read in close proximity to surfaces of various base materials, without the requirement of an expensive, thick and hard encapsulation. Therefore, an RFID tag is provided having an antenna whose impedance and therefore radiation efficiency is relatively insensitive to the base material of items to which it may be attached and the operating environment.

Various modifications to the apparatus will be apparent to those skilled in the art.

The invention claimed is:

1. An antenna for an RFID transponder device having a substrate and an RF integrated circuit, the antenna comprising:
   two opposing conductive elements arranged on one side of the substrate and electrically connected to the integrated circuit;
   a conductive patch arranged between the elements on the same side of the substrate and not electrically connected to them; and
   a group plane on the opposite side of the substrate to the conductive elements and the patch, arranged to partially cover an area corresponding to the elements and a patch,
   wherein a dimension of the patch in the first direction is less than or equal to a corresponding dimension of the patch in the first direction, and
   a dimension of the ground plane in a second direction is greater than or equal to a corresponding dimension of the antenna in the second direction.

2. The antenna of claim 1, wherein each element cooperates with the patch to form at least one slot or notch between the element and the patch.

3. The antenna of claim 2, wherein a length of the at least one slot or notch is greater than a width of it, the width being the distance between the patch and one element.

4. The antenna of claim 2 or claim 3, wherein a width of the at least one slot or notch, the width being the distance between the patch and one element, is less than a width of that element.

5. The antenna of any of claims 2, wherein the width of the at least one slot or notch is substantially uniform along its length.

6. The antenna of claim 5, wherein the width is not more than 4 mm.

7. The antenna of any preceding claim, wherein each element comprises two substantially straight feed lines arranged perpendicular to one another.

8. The antenna of claim 7, wherein the two feed lines are arranged end-to-end so as to form an L shape.

9. The antenna of any of claims 1 wherein each element comprises a convoluted line element.

10. The antenna claim 1, wherein the patch is rectangular.

11. The antenna of claim 1, adapted for an operating frequency of between 860 MHz and 960 MHz, wherein a thickness of the substrate is less than 1 mm.

12. The antenna of claim 1, wherein the substrate is flexible.

13. An RFID transponder device comprising:
   a non-conductive substrate;
   an RF integrated circuit; and
   an antenna according to any claim 1.

* * * * *